United States Patent
Park et al.

(10) Patent No.: US 9,256,536 B2
(45) Date of Patent: Feb. 9, 2016

(54) METHOD AND APPARATUS FOR PROVIDING SHARED CACHES

(71) Applicants: SAMSUNG ELECTRONICS CO., LTD., Suwon (KR); Industry-Academia Cooperation Group of Sejong University, Seoul (KR)

(72) Inventors: Jeong Ae Park, Seoul (KR); Sang Oak Woo, Anyang (KR); Seok Yoon Jung, Seoul (KR); Young sik Kim, Seoul (KR); Woo Chan Park, Seoul (KR)

(73) Assignees: Samsung Electronics Co., Ltd., Suwon-si (KR); INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 227 days.

(21) Appl. No.: 13/873,972

(22) Filed: Apr. 30, 2013

(65) Prior Publication Data

US 2013/0346696 A1   Dec. 26, 2013

(30) Foreign Application Priority Data

Jun. 26, 2012  (KR) .......................... 10-2012-0068370

(51) Int. Cl.
*G06F 12/08* (2006.01)

(52) U.S. Cl.
CPC ........ *G06F 12/0811* (2013.01); *G06F 12/0846* (2013.01); *G06F 12/0875* (2013.01); *G06F 12/0855* (2013.01); *G06F 2212/455* (2013.01); *G06F 2212/601* (2013.01)

(58) Field of Classification Search
None
See application file for complete search history.

(56) References Cited

U.S. PATENT DOCUMENTS

| 5,831,640 | A | 11/1998 | Wang et al. |
| 6,038,642 | A * | 3/2000 | Arimilli et al. ............... 711/130 |
| 6,421,053 | B1 | 7/2002 | Johns et al. |
| 6,469,700 | B1 | 10/2002 | Munshi et al. |
| 2003/0023814 | A1 * | 1/2003 | Barroso et al. ................ 711/122 |
| 2011/0292065 | A1 * | 12/2011 | Minkin ......................... 345/582 |

FOREIGN PATENT DOCUMENTS

| KR | 10-0283413 | 12/2000 |
| KR | 10-0291628 | 3/2001 |
| KR | 10-0420858 | 2/2004 |
| KR | 10-2006-0116916 | 11/2006 |
| KR | 10-2008-0064528 | 7/2008 |

OTHER PUBLICATIONS

Parthasarathy Ranganathan; Reconfigurable Caches and their Application to Media Processing, Proceedings of the 27th International Symposium on Computer Architecture (ISCA-27), Jun. 2000.*

* cited by examiner

*Primary Examiner* — Aimee Li
*Assistant Examiner* — Dustin Bone
(74) *Attorney, Agent, or Firm* — NSIP Law

(57) ABSTRACT

A method and apparatus for providing shared caches. A cache memory system may be operated in a first mode or a second mode. When the cache memory system is operated in the first mode, a first cache and a second cache of the cache memory system may be operated independently. When the cache memory system is operated in the second mode, the first cache and the second cache may be shared. In the second mode, at least one bit may overlap tag bits and set index bits among bits of a memory address.

22 Claims, 8 Drawing Sheets

METHOD AND APPARATUS FOR PROVIDING SHARED CACHES

CROSS-REFERENCE TO RELATED APPLICATIONS

This application claims the priority benefit of Korean Patent Application No. 10-2012-0068370, filed on Jun. 26, 2012, in the Korean Intellectual Property Office, the disclosure of which is incorporated herein by reference.

BACKGROUND

1. Field

Example embodiments of the following disclosure relate to a cache memory system, and more particularly, to a cache memory system for providing shared caches and a method of operating the cache memory system.

2. Description of the Related Art

In the field of graphic design, for example, texture mapping is a method for adding detail, surface texture, or color to a virtual three-dimensional (3D) object in computer graphic applications to provide a realistic feeling to the 3D object.

In order to reduce aliasing effects in texture mapping, various methods may be used, including mipmap method, bilinear filtering method, and trilinear filtering method.

The mipmap method corresponds to a series of texture images, which are generated in a hierarchical structure by downscaling an original texture image in a stepwise manner. That is, the level of the original texture image is designated to be zero, and texture images of higher levels may be generated by downsampling the original texture image by ½ along each of two axes. Generally, the mipmap may be obtained in advance of generating a final image through rendering.

The bilinear filtering method is used to calculate a resulting value of a pixel by applying a weight value to a value of four respective texels neighboring the pixel based on a distance between the pixel and each texel. The value of each texel may correspond to color of the texel, for example, and the result value of the pixel may correspond to color of the pixel. The result value of the pixel may represent a combination of colors of the four neighboring texels of the pixel. A bilinear filtered image may be generated as a result of calculating a result value of each pixel in the image.

The trilinear filtering method is used to calculate a resulting value of a pixel by applying a weight value to a value of each corresponding pixel in two levels of texture images that are selected in a mipmap and processed by bilinear filtering.

To perform bilinear filtering during a single cycle, a need exists to read data of texels in one texture image simultaneously. Also, to perform trilinear filtering during a single cycle, a need exists to read data of texels in at least different two texture images within a mipmap simultaneously.

The bilinear filtering and trilinear filtering may be performed efficiently by providing texel data to a graphic processing unit (GPU) through a cache at a rapid rate. Accordingly, there exists a need for an improved cache memory system.

SUMMARY

The foregoing and/or other aspects are achieved by providing a method of providing data including determining whether data of a memory address is present in a first cache or a second cache, and reading the data from the first cache or the second cache when the data is determined to be present in the first cache or the second cache, at least one bit may overlap tag bits and set index bits among bits representing the memory address.

The method may further include that the set index bits may designate a location in the first cache and a location in the second cache, and the tag bits may be matched with a tag corresponding to the designated location in the first cache or a tag corresponding to the designated location in the second cache to determine whether the data of the memory address is present in the first cache or the second cache.

The method may further include writing data received from an external memory in a selected cache among the first cache and the second cache when the data is determined to be absent in the first cache and the second cache.

The selected cache may be determined based on at least one bit of the set index bits.

The foregoing and/or other aspects are achieved by providing a cache memory system including a first cache and a second cache, the cache memory system may be operated in a mode selected in an alternating manner among a first mode and a second mode, when the cache memory system is operated in the first mode, the first cache and the second cache may be used independently, and when the cache memory system is operated in the second mode, the first cache and the second cache may be shared.

Further, when operating in the first mode, the first cache and the second cache may be used independently to provide data cached for a first memory address and data cached for a second memory address respectively, and when operating in the second mode, the first cache and the second cache may be shared to provide data cached for a third memory address.

Among bits representing the first memory address, first tag bits and first set index bits may not overlap one another.

The first set index bits may designate a first location in the first cache.

The first tag bits may be matched with a tag corresponding to the first location of the first cache to determine whether data of the first memory address is present in the first cache.

Among bits representing the second memory address, second tag bits and second set index bits may not overlap one another.

The second set index bits may designate a second location in the second cache.

The second tag bits may be matched with a tag corresponding to the second location of the second cache to determine whether data of the second memory address is present in the second cache.

Among bits representing the third memory address, at least one bit may overlap third tag bits and third set index bits.

The third set index bits may designate a third location in the first cache and a fourth location in the second cache.

The third tag bits may be matched with a tag corresponding to the third location in the first cache or a tag corresponding to the fourth location in the second cache to determine whether data of the third memory address is present in the first cache or the second cache.

The cache memory system may provide texel data for trilinear filtering in the first mode and texel data for bilinear filtering in the second mode.

In the first mode, the first cache may provide texel data of a first texture image and the second cache may provide texel data of a second texture image in the first mode.

The first texture image and the second texture image may correspond to different levels of texture images in a mipmap.

In the second mode, a bit overlapping the third tag bits of the third set index bits may be excluded from bits used to select one of the first cache and the second cache.

Data stored in the first cache or the second cache may continue to be used when the cache memory system shifts from the first mode to the second mode or from the second mode to the first mode.

The foregoing and/or other aspects are achieved by providing a method of providing data in a cache memory system including a first cache and a second cache, the method including operating the cache memory system in a first mode and operating the cache memory system in a second mode, the cache memory system may be operated in a mode selected in an alternating manner among the first mode and the second mode, when the cache memory system is operated in the first mode, the first cache and the second cache may be used independently, and when the cache memory system is operated in the second mode, the first cache and the second cache may be shared.

Further, when operating in the first mode, the first cache and the second cache may be used independently to provide data cached for a first memory address and data cached for a second memory address respectively, and when operating in the second mode, the first cache and the second cache may be shared to provide data cached for a third memory address.

The foregoing and/or other aspects are achieved by providing a method of providing data of a memory address, including: determining whether the data is present in a first cache or a second cache; accessing each of the first cache and the second cache, according to shared set index bits, among bits representing the memory address; and generating a 'hit' when it is determined that the data is present in at least one of the first cache and the second cache.

The foregoing and/or other aspects are achieved by providing a method of providing data, including: sharing cache memories when operating in a predetermined mode; determining, by a processor, whether data of a memory address is present in the shared cache memories, using shared set index bits, among bits representing the memory address; and generating a 'hit' when the data is present in one of the shared cache memories.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
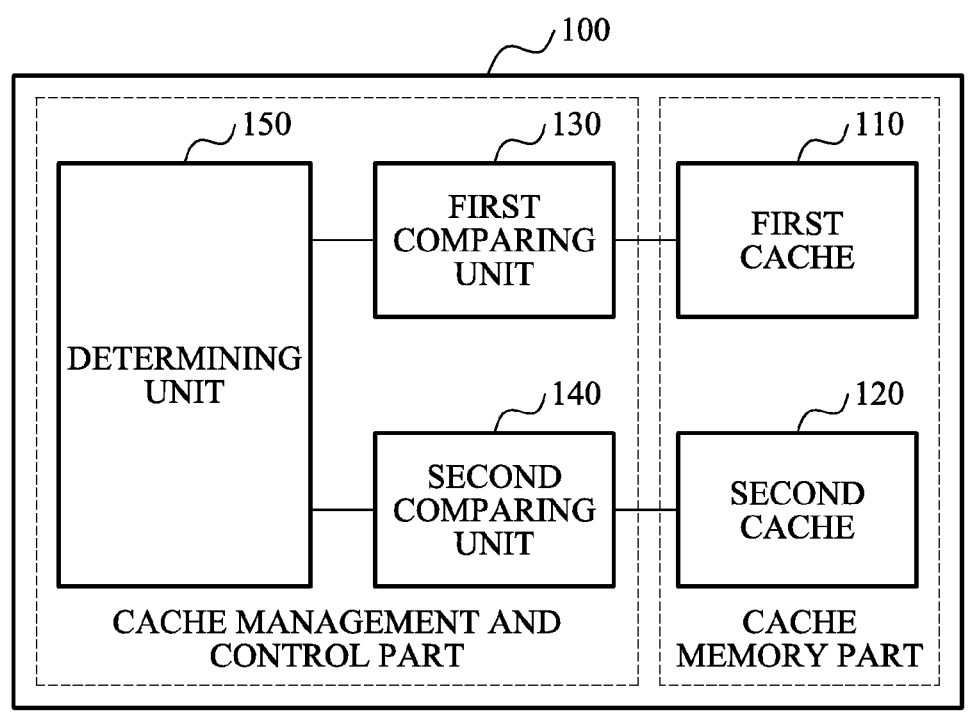
FIG. 1 illustrates an example of a cache memory system, according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an example of a cache memory system 100, according to example embodiments.

The cache memory system 100 may include a first cache 110, a second cache 120, a first comparing unit 130, a second comparing unit 140, and a determining unit 150. The cache memory system may include at least one processing device.

The cache memory system 100 may include a cache memory part and a cache management and control part. The first cache 110 and the second cache 120 may be included in the cache memory part. The first comparing unit 130, the second comparing unit 140, and the determining unit 150 may be included in the cache management and control part. The above described cache memory part and the cache management and control part are exemplary, and thus, the parts may include additional, for example.

Each of the first cache 110 and the second cache 120 may correspond to a direct mapped cache, for example. Further, each of the first cache 110 and the second cache 120 may store data inputted from an external memory.

Each of the first cache 110 and the second cache 120 may include K cache lines. K may represent a size of the first cache 110 and a size of the second cache 120, and may be an integer of 1 or more. Further, in another example embodiment, the first cache 110 and the second cache 120 may include different number of cache lines from each other.

The cache memory system 100 may receive a request for data of a predetermined memory address from an external entity. The external entity may include a central processing unit (CPU) and a graphics processing unit (GPU), for example.

The first comparing unit 130 may verify whether the data of the memory address requested to the cache memory system 100 is present in the first cache 110. The first comparing unit 130 may provide the verified result to the determining unit 150. When the requested data of the memory address is present in the first cache 110, the first comparing unit 130 may output a 'hit in cache' signal to the determining unit 150 or the external entity. When the requested data of the memory address is absent in the first cache 110, the first comparing unit 130 may output a 'miss in cache' signal to the determining unit 150 or the external entity. The first comparing unit 130 and the second comparing unit 140 may provide the determining unit 150 with the corresponding verified result simultaneously or sequentially, depending on embodiments.

The second comparing unit 140 may verify whether the data of the memory address requested to the cache memory system 100 is present in the second cache 120. The second comparing unit 140 may provide the verified result to the determining unit 150. When the requested data of the memory address is present in the second cache 120, the second comparing unit 140 may output a 'hit in cache' signal to the determining unit 150 or the external entity. When the requested data of the memory address is absent in the second cache 120, the second comparing unit 140 may output a 'miss in cache' signal to the determining unit 150 or the external entity.

The determining unit 150 may determine whether the requested data of the memory address is present in the cache memory system 100 based on the verified result provided by the first comparing unit 130 and the verified result provided by the second comparing unit 140. When at least one of the first comparing unit 130 and the second comparing unit 140 outputs a 'hit in cache' signal, the determining unit 150 may output a 'hit in cache' signal indicating that the requested data of the memory address is present in the cache memory system 100. When both the first comparing unit 130 and the second comparing unit 140 output a 'miss in cache' signal, the determining unit 150 may output a 'miss in cache' signal indicating that the requested data of the memory address is absent in the cache memory system 100.

Hereinafter, the 'hit in cache' signal and the 'miss in cache' signal may be abbreviated to a 'hit' and a 'miss', respectively.

Figure 2:
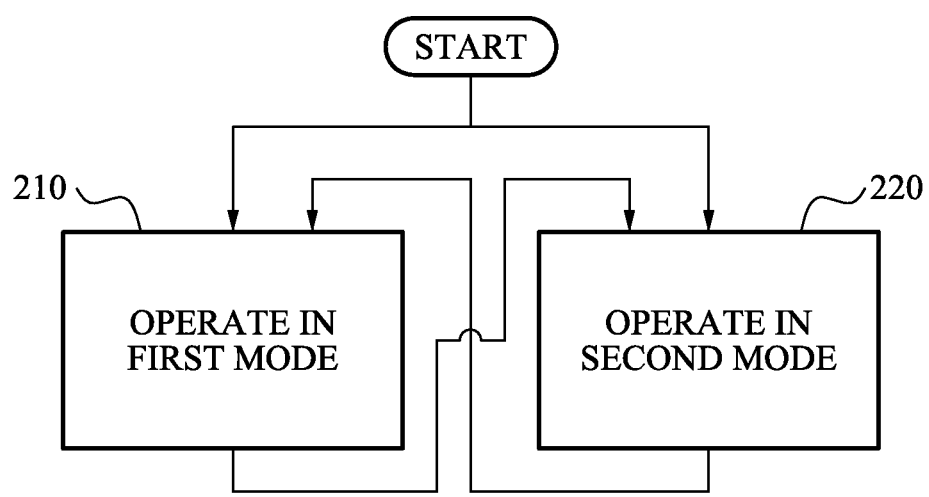
FIG. 2 illustrates an example of a method for operating a cache memory system, according to example embodiments.

FIG. 2 illustrates an example of a method of operating the cache memory system 100, according to example embodiments.

The cache memory system 100 may be operated in one mode selected in an alternating manner among a first mode and a second mode.

In operation 210, the cache memory system 100 may be operated in the first mode.

In operation 220, the cache memory system 100 may be operated in the second mode.

The cache memory system 100 may shift from the first mode to the second mode and from the second mode to the first mode, for example, in an alternating manner, as shown in FIG. 2.

When the cache memory system 100 is operated in the first mode, the first cache 110 and the second cache 120 may be used independently to provide data cached for a first memory address and data cached for a second memory address, respectively. That is, the first mode may enable the first cache 110 and the second cache 120 to store and provide data of different memory addresses independently.

When the cache memory system 100 is operated in the second mode, the first cache 110 and the second cache 120 may be shared to provide data cached for a memory address, for example, a third memory address. The second mode may enable sharing of the first cache 110 and the second cache 120 to provide data of a memory address. However, the present application is not limited to sharing two caches.

The operation of the cache memory system 100 in the first mode and the second mode is described in further detail with reference to FIGS. 3 through 8.

Figure 3:
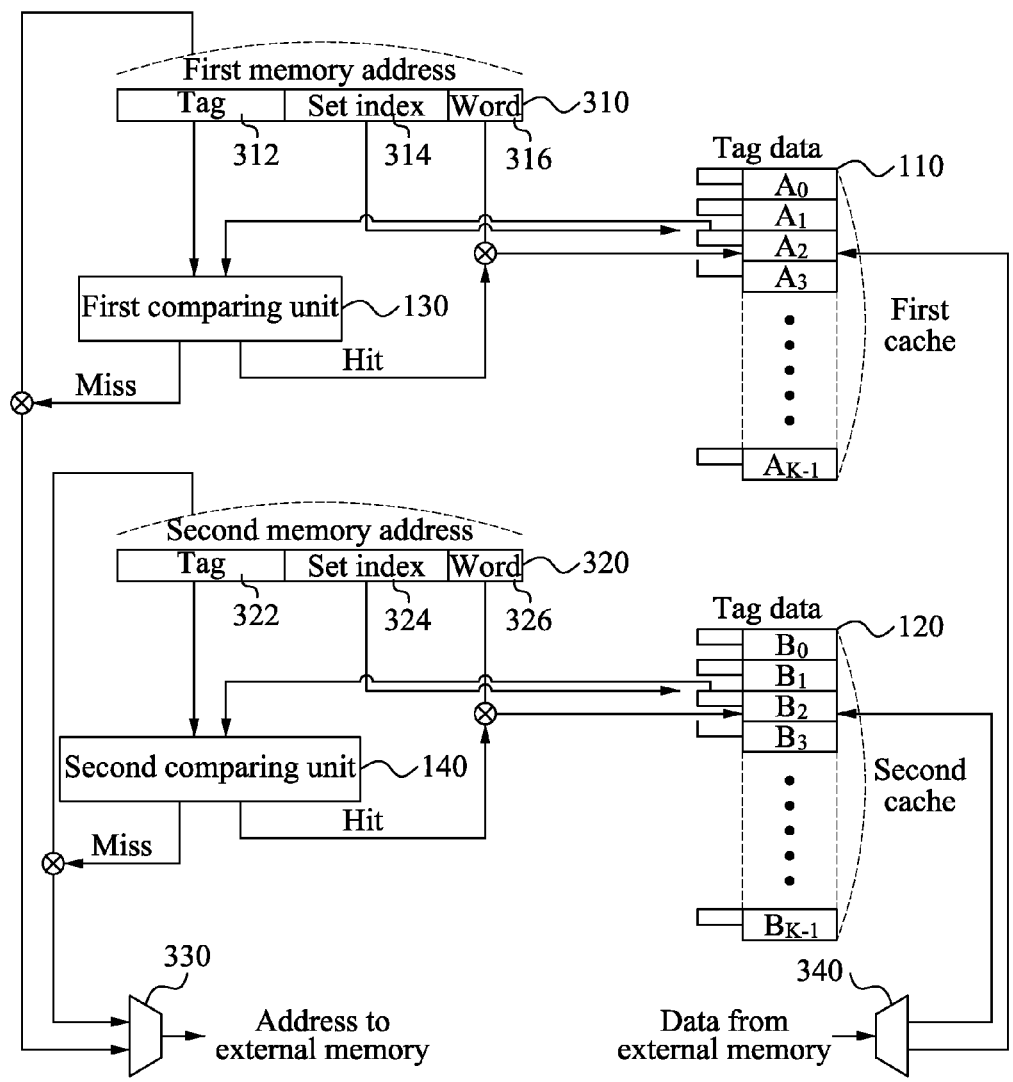
FIG. 3 illustrates an example of operation of a cache memory system in a first mode, according to example embodiments.

FIG. 3 illustrates an example of operation of the cache memory system 100 in the first mode, according to example embodiments.

In the first mode, a first memory address 310 and a second memory address 320 may be inputted in the cache memory system 100. The first memory address 310 and the second memory address 320 may be inputted in the cache memory system 100 simultaneously, or may be inputted at different times.

In the first mode, for example, the cache memory system 100 may be operated for trilinear filtering. In the first mode, the cache memory system 100 may provide texel data for trilinear filtering. Each of the first cache 110 and the second cache 120 may be operated for bilinear filtering, for example. In the first mode, the first cache 110 may provide texel data of a first texture image among texture images in a mipmap, and the second cache 120 may provide texel data of a second texture image among texture images in a mipmap. For example, the first texture image and the second texture image may correspond to texture images of different levels in the mipmap.

The first memory address 310 may correspond to an address for cache access inputted in the first cache 110 of the cache memory system 100 from a bilinear filtering pipeline of a GPU, for example. The second memory address 320 may correspond to an address for cache access inputted in the second cache 120 of the cache memory system 100 from a bilinear filtering pipeline of a GPU, for example.

The first memory address 310 may include a tag 312, a set index 314, and a word 316. That is, bits representing the first memory address 310 may include a sequence of first tag bits representing the tag 312, a sequence of first set index bits representing the set index 314, and a sequence of first word bits representing the word 316.

The second memory address 320 may include a tag 322, a set index 324, and a word 326. That is, bits representing the second memory address 320 may include a sequence of second tag bits representing the tag 322, a sequence of second set index bits representing the set index 324, and a sequence of second word bits representing the word 326.

In the first mode, the first tag bits and the first set index bits among the bits representing the first memory address 310 may not overlap one another. Also, the second tag bits and the second set index bits among the bits representing the second memory address 320 may not overlap one another.

Hereinafter, operation of the first cache 110 is described.

The set index 314 of the first memory address 310 may indicate one of the cache lines of the first cache 110. The first set index bits may designate a first location in the first cache 110. The first location may indicate one or more of the K cache lines of the first cache 110. In FIG. 3, the K cache lines are indicated as $A_0$ through $A_{K-1}$. 'K' may be an integer of 1 or more.

The first location may correspond to a location in the first cache 110 in which data of the first memory address 310 may be stored. A tag and a cache line corresponding to the first location may be present in the first cache 110. For example, when a value of the first set index bits is k, the first location may correspond to a $k^{th}$ cache line and a tag of the $k^{th}$ cache line. When a number of the first set index bits is $n_1$, $n_1$ may be determined by $\log_2 k$. $n_1$ may be an integer of 1 or more. 'k' may be an integer in a range between 0 and K−1.

The first comparing unit 130 may match the first tag bits with the tag corresponding to the first location of the first cache 110 to determine whether the data of the first memory address 310 is present in the first cache 110. For example, matching may include verifying whether a value of the first tag bits is equal to a value of bits representing the tag corresponding to the first location in the first cache 110.

When the first tag bits are matched or compared with the tag corresponding to the first location, the first comparing unit 130 may generate a 'hit'. The 'hit' may represent that the data of the first memory address 310 is present in the first cache 110. A 'miss' may represent that the data of the first memory address 310 is absent in the first cache 110.

When the 'hit' is generated, the first word bits may be used to designate the data of the first memory address 310 in the cache line corresponding to the first location. The first word bits may select an effective portion among the data cached in the cache line. The cache memory system 100 may provide the data designated by the first word bits to an entity requesting the data of the first memory address 310. The cache memory system 100 may output the data designated by the first word bits.

When the 'miss' is generated, at least one of the cache memory system 100 and the first cache 110 may request data from an external memory. The requested data may include the data of the first memory address 310. The requested data may include data identified by the first tag bits and the first set index bits. An address of the requested data may be in a range of a start address and an end address. For example, the start address may be composed of the first tag bits, the first set index bits, and bits having a value of 0. The end address may be composed of the first tag bits, the first set index bits, and bits having a value of 1.

To identify the requested data, the cache memory system 100 may output the first memory address 310 to the external memory. The cache memory system 100 may receive the requested data including the data of the first memory address 310 from the external memory. The first cache 110 may update the value of the tag corresponding to the first location with the value of the first tag bits, and may store the data transmitted from the external memory in the cache line corresponding to the first location.

Hereinafter, operation of the second cache 120 is described.

The set index 324 of the second memory address 320 may indicate one of the cache lines of the second cache 120. The second set index bits may designate a second location in the second cache 120. The second location may indicate one of the K cache lines of the second cache 120. In FIG. 3, the K cache lines are indicated as $B_0$ through $B_{K-1}$.

The second location may correspond to a location in the second cache 120 in which data of the second memory address 320 may be stored. A tag and a cache line corresponding to the second location may be present in the second cache 120. For example, when a value of the second set index bits is k, the second location may correspond to a $k^{th}$ cache line and a tag of the $k^{th}$ cache line. When a number of the second set index bits is $n_2$, $n_2$ may be determined by $\log_2 k$. $n_2$ may be an integer of 1 or more.

The second comparing unit 140 may compare or match the second tag bits with the tag corresponding to the second location of the second cache 120 to determine whether the data of the second memory address 320 is present in the second cache 120. Matching may include verifying whether a value of the second tag bits is equal to a value of bits representing the tag corresponding to the second location.

When the second tag bits are compared or matched with the tag corresponding to the second location, the second comparing unit 140 may generate a 'hit' when the compared bits are equal. When the second tag bits are compared with the tag corresponding with the second location, the second comparing unit 140 may generate a 'miss' when the compared bits are not equal. The 'hit' may represent that the data of the second memory address 320 is present in the second cache 120. A 'miss' may represent that the data of the second memory address 320 is absent in the second cache 120.

When the 'hit' is generated, the second word bits may be used to designate the data of the second memory address 320 in the cache line corresponding to the second location. The second word bits may be used to select an effective portion of data among the data cached in the cache line. The cache memory system 100 may provide the data designated by the second word bits to an entity requesting the data of the second memory address 320. The cache memory system 100 may output the data designated by the second word bits.

When the 'miss' is generated, at least one of the cache memory system 100 and the second cache 120 may request data from an external memory. The requested data may include the data of the second memory address 320. The requested data may include data identified by the second tag bits and the second set index bits. An address of the requested data may be in a range of a start address and an end address. The start address may be composed of the first tag bits, the first set index bits, and bits having a value of 0. The end address may be composed of the first tag bits, the first set index bits, and bits having a value of 1.

To identify the requested data, the cache memory system 100 may output the second memory address 320 to the external memory. The cache memory system 100 may receive the requested data including the data of the second memory address 320 from the external memory. The second cache 120 may update the value of the tag corresponding to the second location with the value of the second tag bits, and may store the data transmitted from the external memory in the cache line corresponding to the second location.

Depending on embodiments, the first cache 110 and the second cache 120 may be operated simultaneously, or may be operated at different times. For example, when operated simultaneously, the first cache 110 and the second cache 120 may generate a 'miss' simultaneously. To process the 'miss' generated simultaneously, the cache memory system 100 may further include a multiplexer 330 and a demultiplexer 340, as shown in FIG. 3. The multiplexer 330 may receive the first memory address 310 when the first cache 110 generates the 'miss', and may receive the second memory address 320 when the second cache 120 generates the 'miss'. The multiplexer 330 may request, from the external memory, the data requested by the first cache 110 and the data requested by the second cache 120 simultaneously or sequentially. The demultiplexer 340 may transmit the data received from the external memory to the first cache 110 and the second cache 120 simultaneously or sequentially.

Figure 4:
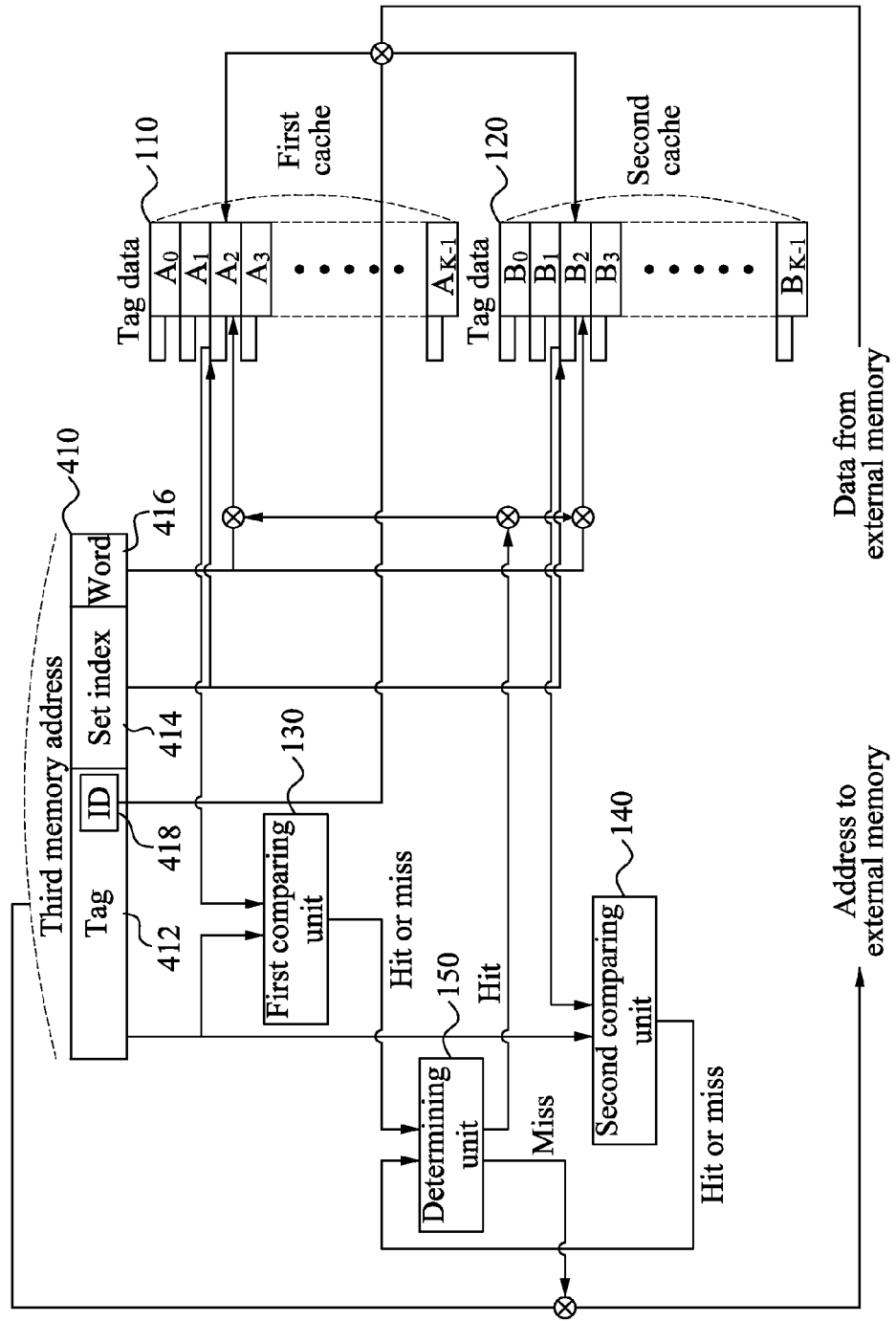
FIG. 4 illustrates an example of operation of a cache memory system in a second mode, according to example embodiments.

FIG. 4 illustrates an example of operation of the cache memory system 100 in the second mode, according to example embodiments.

In the second mode, a third memory address 410 may be inputted in the cache memory system 100.

In the second mode, the cache memory system 100 may be operated using the bilinear filtering method. In the second mode, the cache memory system 100 may provide texel data for bilinear filtering. For bilinear filtering, the first cache 110 and the second cache 120 may be shared and operated as if two independent caches are one cache. The second mode may allow efficient cache usage when a cache memory system of hardware designed for trilinear filtering is operated using the bilinear filtering method. The first cache 110 and the second cache 120 may be operated using the bilinear filtering method, however, the present disclosure is not limited thereto. In the second mode, the second cache 120 may provide texel data of a third texture image among texture images in a mipmap.

The third memory address 410 may correspond to an address for cache access inputted in the first cache 110 and the second cache 120 of the cache memory system 100 from a bilinear filtering pipeline of a GPU, for example.

The third memory address 410 may include a tag 412, a set index 414, and a word 416. That is, bits representing the third memory address 410 may include a sequence of third tag bits representing the tag 412, a sequence of third set index bits representing the set index 414, and a sequence of third word bits representing the word 416. The number of bits in the sequence of bits may be equal or different, depending on embodiments.

Figure 5:
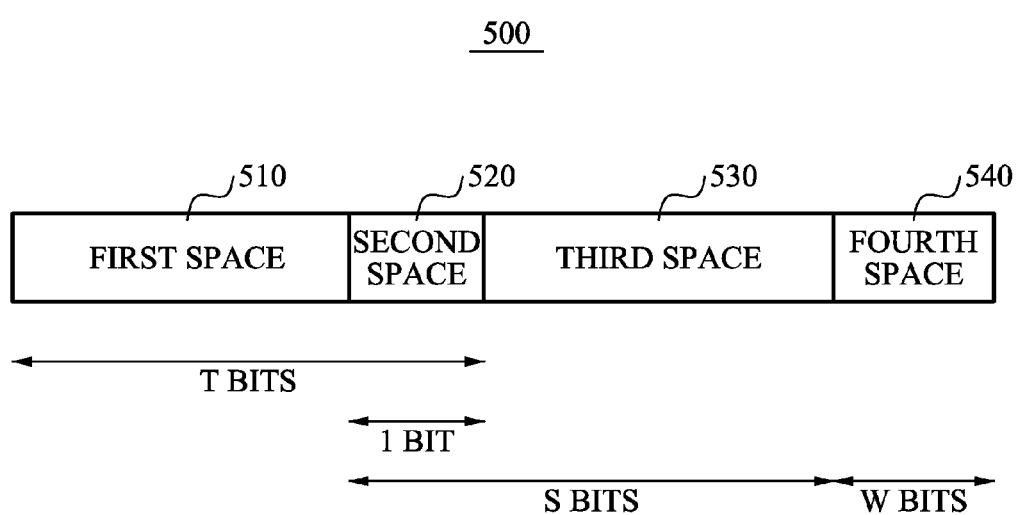
FIG. 5 illustrates an example of a memory address, according to example embodiments.

In the second mode, at least one bit may overlap between the third tag bits and the third set index bits among the bits representing the third memory address 410. The overlapping bit may be used to identify a cache associated with the third memory address 410 among the first cache 110 and the second cache 120. Hereinafter, the overlapping bit used to identify a cache is referred to as an identifier (ID). In FIG. 5, a part corresponding to an ID bit in the tag 412 is indicated as an ID 418.

The ID bit may indicate one of the first cache 110 and the second cache 120. For example, when a value of the ID bit is 0, the ID bit may indicate the first cache 110. When the value of the ID bit among the bits representing the third memory address 410 is 0, data of the third memory address 410 may be read from the first cache 110, and may be written in the first cache 110. When the value of the ID bit is 1, the ID bit may indicate the second cache 120. When the value of the ID bit among the bits representing the third memory address 410 is 1, data of the third memory address 410 may be read from the second cache 120, and may be written in the second cache 120.

However, the above description is exemplary, and thus, in another embodiment, the ID bit of 1 may indicate the first cache 110 and the ID bit of 0 may indicate the second cache 120. Further, the ID bit is not limited to one bit, and thus, the ID bit may include more than one bit.

The set index 414 of the third memory address 410 may indicate one of the cache lines of the first cache 110 and one of the cache lines of the second cache 120. The third set index bits may designate a third location in the first cache 110 and a fourth location in the second cache 120. When the third set index bits designate the third location and the fourth location, only the remaining bits excluding the ID bit among the third set index bits may be used. The third location may indicate one of the K cache lines of the first cache 110, and the fourth location may indicate one of the K cache lines of the second cache 120. However, the third location and the fourth location may or may not be the same kth line in the respective first cache 110 and the second cache 120.

The third location may correspond to a location in the first cache 110 in which the data of the third memory address 410 may be stored when the ID bit indicates the first cache 110. The fourth location may correspond to a location in the second cache 120 in which the data of the third memory address 410 may be stored when the ID bit indicates the second cache 120.

The first comparing unit 130 may match or compare the third tag bits with the tag corresponding to the third location of the first cache 110 to determine whether the data of the third memory address 410 is present in the first cache 110. The matching may include verifying whether a value of the third tag bits is equal to a value of bits representing the tag corresponding to the third location. As described in the foregoing, the third tag bits may include the ID bit. Accordingly, in the matching, the ID bit may be included. The bits representing the tag corresponding to the third location of the first cache 110 may include a bit corresponding to the ID bit.

The second comparing unit 140 may match or compare the third tag bits with the tag corresponding to the fourth location of the second cache 120 to determine whether the data of the third memory address 410 is present in the second cache 120. Matching may include verifying whether a value of the third tag bits is equal to a value of bits representing the tag corresponding to the fourth location. As described in the foregoing, the third tag bits may include the ID bit. Accordingly, in the matching, the ID bit may be included. The bits representing the tag corresponding to the fourth location of the second cache 120 may include a bit corresponding to the ID bit.

The third tag bits may be matched or compared with the tag corresponding to the third location corresponding to the third location of the first cache 110 and the tag corresponding to the fourth location of the second cache 140 to determine whether the data of the third memory address 410 is present in the first cache 110 or the second cache 120. The matching or comparing may be performed simultaneously or sequentially, depending on embodiments.

When the third tag bits are matched or compared with the tag corresponding to the third location, the first comparing unit 130 may generate a 'hit' signal when the compared bits are equal. The 'hit' may represent that the data of the third memory address 410 is present in the first cache 110. A 'miss' may represent that the data of the third memory address 410 is absent in the first cache 110.

When the third tag bits are matched or compared with the tag corresponding to the fourth location, the second comparing unit 140 may generate a 'hit' signal when the compared bits are equal. The 'hit' may represent that the data of the third memory address 410 is present in the second cache 120. A 'miss' may represent that the data of the third memory address 410 is absent in the second cache 120.

When the 'hit' is generated by the first comparing unit 130 or the second comparing unit 140, the third word bits may be used to designate the data of the third memory address 410 in the cache line corresponding to the third location or the cache line corresponding to the fourth location based on the results of the first comparing unit 130 and the second comparing 140. The third word bits may be used to select an effective portion of data among the data cached in the cache line corresponding to the third location or the cache line corresponding to the fourth location.

When the 'hit' is generated by the first comparing unit 130 or the second comparing unit 140, the determining unit 150 may generate a 'hit'. The 'hit' may include at least one of the signals indicating the 'hit' of the first cache 110, the 'hit' of the second cache 120, and all the 'hits'. When the 'hit' is generated by the determining unit 150, the third word bits may be used to designate the data of the third memory address 410 in the cache line corresponding to the third location or the cache line corresponding to the fourth location.

The cache memory system 100 may provide the data designated by the third word bits to an entity requesting the data of the third memory address 410. The cache memory system 100 may output the data designated by the third word bits.

When the 'miss' is generated by the first comparing unit 130 or the second comparing unit 140, the determining unit 150 may generate a 'miss'. When the 'miss' is generated by the determining unit 150, the cache memory system 100 or the determining unit 150 may request data from an external memory. The requested data may include the data of the third memory address 410. The requested data may include data identified by the third tag bits and the third set index bits. An address of the requested data may be in a range of a start address and an end address. The start address may be composed of the first tag bits, the first set index bits, and bits having a value of 0. The end address may be composed of the first tag bits, the first set index bits, and bits having a value of 1. To identify the requested data, the cache memory system 100 or the determining unit 150 may output the third memory address 410 to the external memory. The cache memory system 100 may receive the requested data including the data of the third memory address 410 from the external memory.

The ID bit may represent a cache to store the received data among the first cache 110 and the second cache 120. For example, when a value of the ID bit is 0, the received data may be written in the first cache 110. The first cache 110 may update the value of the tag corresponding to the third location with the value of the third tag bits, and may store the data transmitted from the external memory in the cache line corresponding to the third location. When a value of the ID bit is 1, the received data may be written in the second cache 120. The second cache 120 may update the value of the tag corresponding to the fourth location with the value of the third tag bits, and may store the data transmitted from the external memory in the cache line corresponding to the fourth location. However, the above is exemplary, and thus, the present disclosure is not limited thereto.

As described in the foregoing, the cache memory system 100 may access the first cache 110 or the second cache 120 by referring to the 'hit' or 'miss' generated by the determining unit 150.

Using the shared caches, the efficiency of the caches may be improved.

FIG. 5 illustrates an example of a memory address, according to an example embodiment.

Referring to FIG. 5, an entire region 500 of the memory address is provided. The memory address may correspond to the first memory address 310 and the second memory address 320 as described in FIG. 3, and may correspond to the third memory address 410 as described in FIG. 4.

The entire space 500 may include a first space 510, a second space 520, a third space 530, and a fourth space 540. The first space 510 may include 'T−1' bits. 'T' may be an integer of 2 or more. The second space 520 may include one bit. However, one bit may be exemplary, and thus, the present disclosure is not limited thereto. For example, when the cache memory system 100 includes $2^m$ caches, the second space may include 'm' bits. 'm' may be an integer of 2 or more. The third space 530 may include 'S−1' bits. 'S' may be an integer of 2 or more. The fourth space 540 may include W bits.

In the first mode, the tag bits of the memory address may correspond to 'T' bits, which include the bits of the first space 510 and the second space 520. The set index bits of the memory address may correspond to 'S−1' bits of the third space 530. The word bits may correspond to W bits of the fourth space 540. In the first mode, the tag bits and the set index bits may not overlap one another. As such, the first cache 110 and the second cache 120 are operated independently.

In the second mode, the tag bits of the memory address may correspond to 'T' bits, which include the bits of the first space 510 and the second space 520. The set index bits of the memory address may correspond to 'S' bits, which includes the bits of the second space 520 and the third space 530. The word bits may correspond to 'W' bits of the fourth space 540. In the second mode, at least one bit may overlap between the tag bits and the set index bits. The overlapping bit may correspond to an ID bit. The ID bit may correspond to at least one most significant bit (MSB) among the set index bits. However, using one bit as an ID bit is exemplary, and thus, the ID may be represented by more than one bit.

When each of the first cache 110 and the second cache 120 includes K cache lines, then the following equation applies: $K=2^{S-1}$. One cache line may store data of neighboring $2^w$ memory addresses.

The memory address described in the foregoing may be used to resolve two issues described below.

The first issue is associated with use of data of a cache for tag. When the first cache 110 and the second cache 120 are shared in the second mode, the entire cache size may be doubled. When the entire cache size is doubled, the cache line size may be doubled. The line size may correspond to a number of cache lines.

When the cache line size is expanded, data stored in the tag of the first cache 110 and the tag of the second cache 120 during operation of the cache memory system 100 in the first mode may be invalid in the second mode. This is due to a number of set index bits being increased by 1 when the cache line size is expanded, and accordingly, a number of tag bits may be decreased by 1.

To resolve the first issue, the tag bits and the set index bits may share at least one bit during operation of the cache memory system 100 in the second mode. The shared bit may correspond to at least one least significant bit (LSB) among the tag bits in the first mode. Through sharing, a number of tag bits may be maintained even though a number of set index bits is increased by 1 when the cache memory system 100 shifts from the first mode to the second mode. In the first and second modes, the first cache 110 and the second cache 120 may use tag data of a fixed size, absent separate bit manipulation for the tag data.

The second issue is associated with use of data of a cache.

In the first mode, the first cache 110 and the second cache 120 may be used independently. This independent use may represent that the same data may be stored in a cache line of the first cache 110 and a cache line of the second cache 120 corresponding to a predetermined set index. Using this storage feature, data in the first cache 110 and data in the second cache 120 may be used in the second mode.

Hereinafter, use of data of each cache is described in further detail with reference to FIGS. 6 and 7.

In the first mode and the second mode, a number of tag bits may be unchanged. Accordingly, data stored in the first cache 110 or the second cache 120 may continue to be used without being discarded when the cache memory system 100 shifts from the first mode to the second mode or from the second mode to the first mode.

Figure 6:
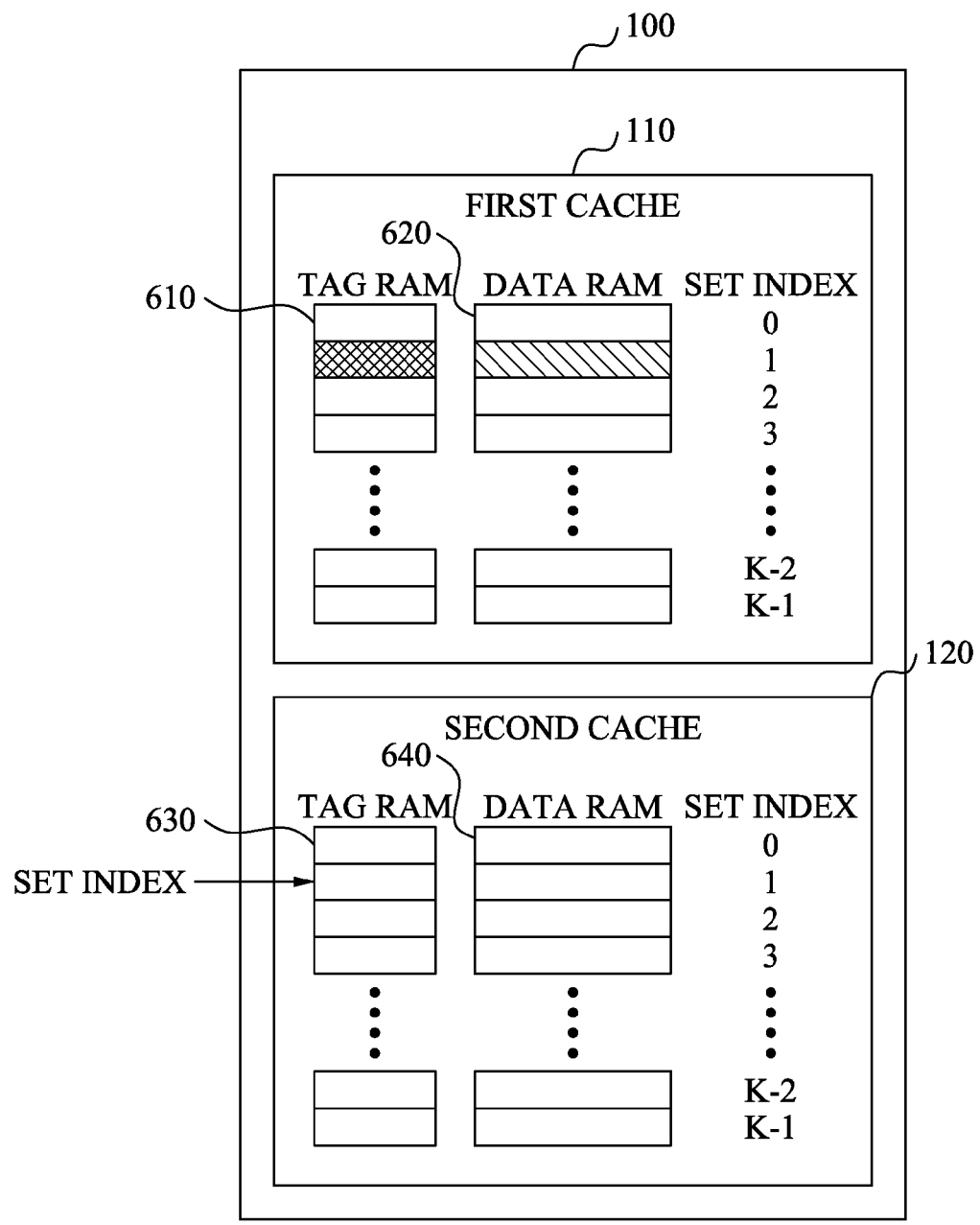
FIG. 6 illustrates an example of accessing data of a cache, according to example embodiments.

FIG. 6 illustrates an example of access to data of a cache.

The first cache 110 may include a tag random access memory (RAM) 610 and a data RAM 620. The tag RAM 610 may correspond to a space in which tags of the first cache 110 may be stored. The data RAM 620 may correspond to a space in which data of the first cache 110 may be stored. Each of the tag RAM 610 and the data RAM 620 may be divided into at least one area and each area may correspond to a set index value.

The second cache 120 may include a tag RAM 630 and a data RAM 640. The tag RAM 630 may correspond to a space in which tags of the second cache 120 may be stored. The data RAM 640 may correspond to a space in which data of the second cache 120 may be stored. Each of the tag RAM 630 and the data RAM 640 may be divided into at least one area and each area may correspond to a set index value.

In FIG. 6, the set index may have a value in a range between 0 and K−1. To store a tag and data in each of K cache lines, the tag RAM 610 of the first cache 110, the data RAM 620 of the first cache 110, the tag RAM 630 of the second cache 110, the data RAM 640 of the second cache 110 may be each divided into K areas, for example.

In FIG. 6, requested data of the memory address may be stored in an area of the data RAM 620 of the first cache 110 in which the set index is 1, for example, as shown by the diagonal lines of the data RAM 620. In FIG. 6, the first cache 110 and the second cache 120 may be operated independently. Using the set index, the cache memory system 100 may access a location corresponding to the set index of the second cache 120. Since the requested data is stored in the first cache 110, a 'miss' in access to the second cache 120 may be generated.

Figure 7:
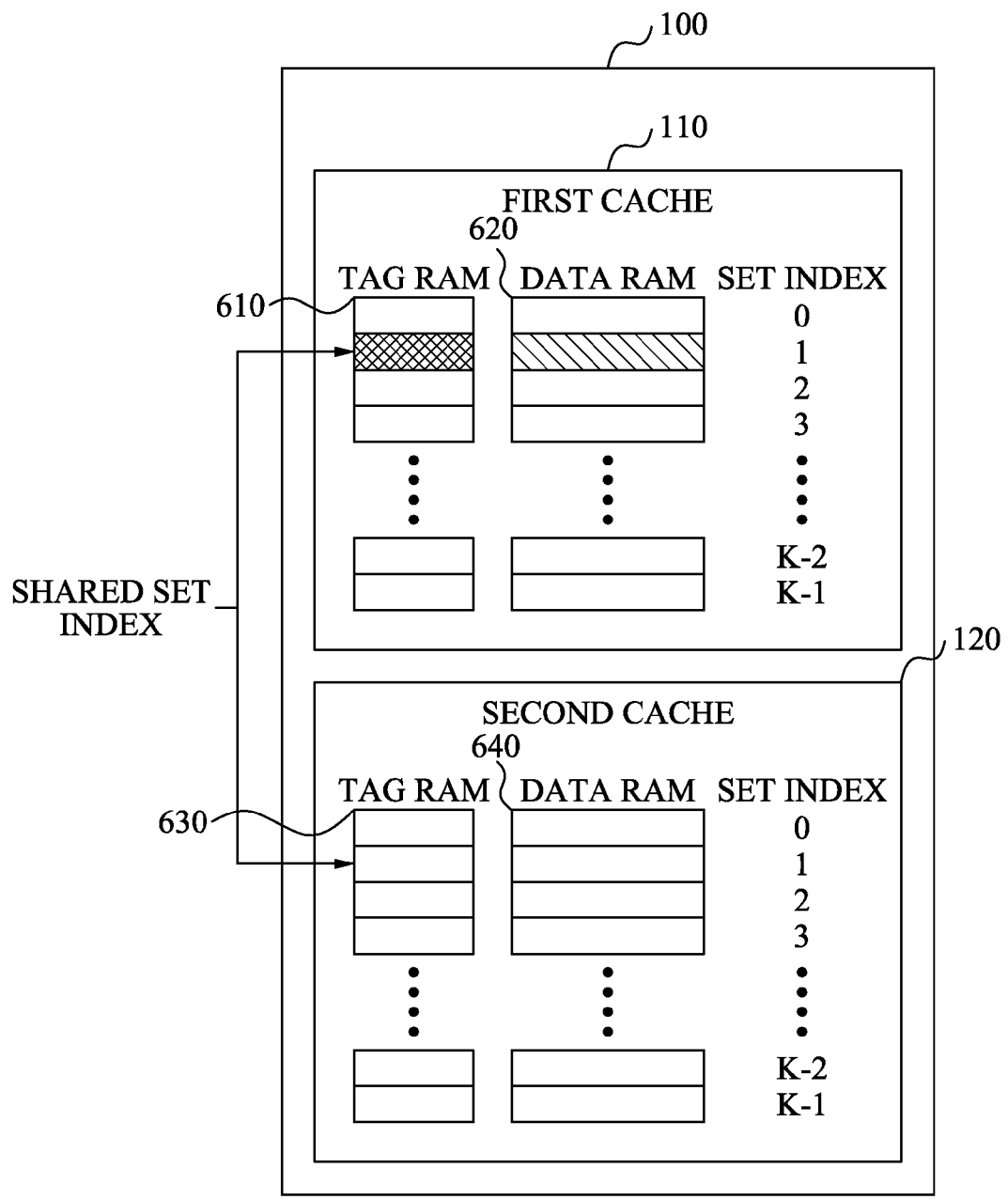
FIG. 7 illustrates an example of accessing data of a shared cache, according to example embodiments.

FIG. 7 illustrates an example of access to data of a shared cache, according to an example embodiment.

In FIG. 7, the first cache 110 and the second cache 120 may be shared as described below.

Using a shared set index, the cache memory system 100 may access a location corresponding to the shared set index value of the first cache 110 and a location corresponding to the shared set index value of the second cache 120. As shown in FIG. 7, the area of the data RAM 620 of the first cache 110 and the area of the data RAM 640 of the second cache 120 are each accessed according to the shared set index value of 1. To calculate the locations, the remaining bits excluding an ID bit among the set index bits may be used.

Since the requested data is stored in the first cache 110, a 'hit' in access to the first cache 110 may be generated and a 'miss' in access to the second cache 120 may be generated.

To perform the operation described with reference to FIGS. 6 and 7, an ID bit including at least one bit and the determining unit 150 may be used.

When a 'miss' is generated in the second mode, the ID bit may indicate a cache to store among the first cache 110 and the second cache 120.

When a simultaneous access to the shared first and second caches 110 and 120 is made, the determining unit 150 may determine whether a 'hit' or 'miss' in the simultaneous access to the shared caches is generated. Information required for the determining may include a verified result about access to the first cache 110 by the first comparing unit 130 and a verified result about access to the second cache 120 by the second comparing unit 140.

Figure 8:
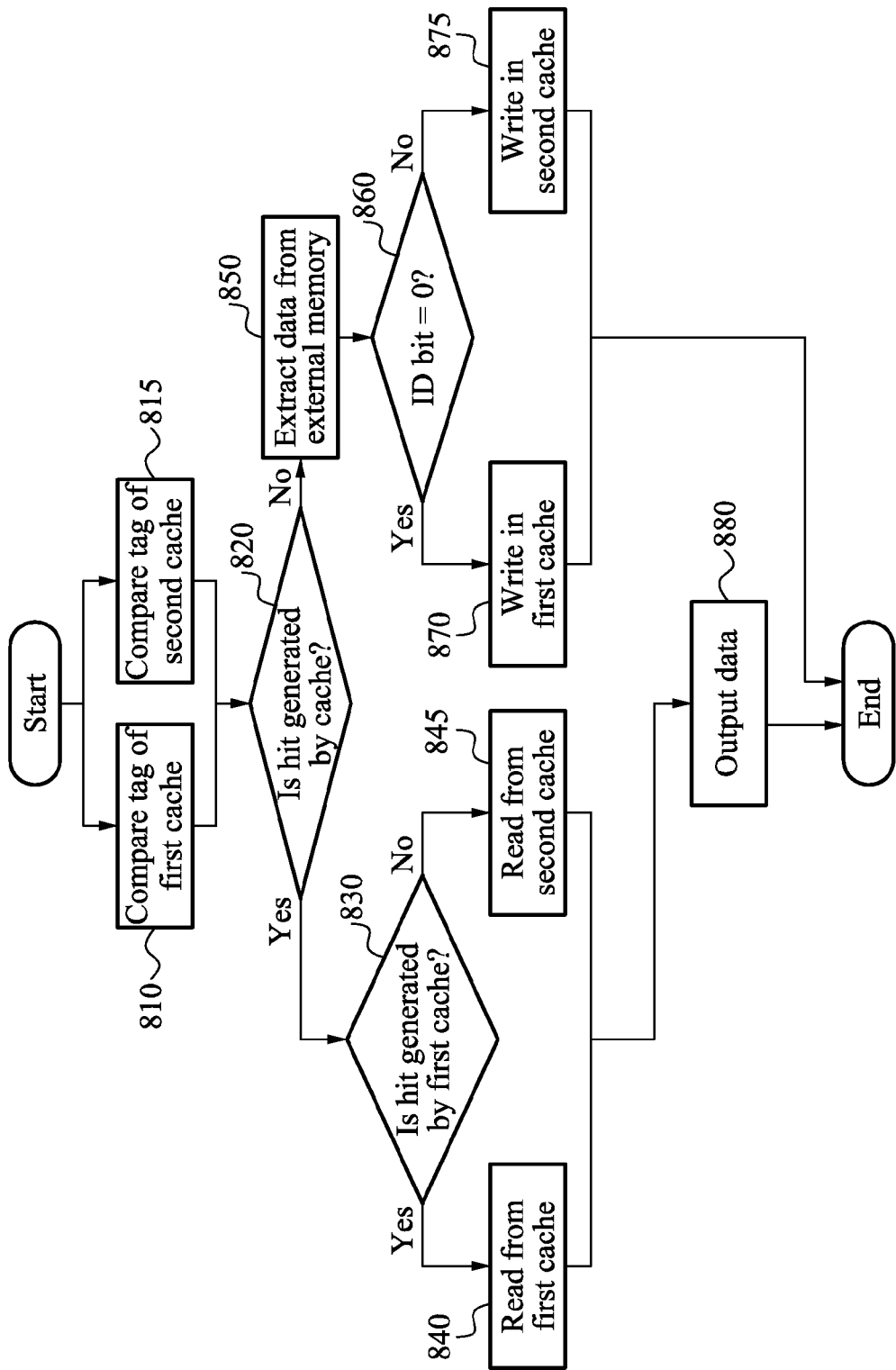
FIG. 8 illustrates an example of a method for providing data, according to example embodiments.

FIG. 8 illustrates an example of a method of providing data, according to an example embodiment.

In FIG. 8, an example embodiment of the above-described the method is illustrated through operations 810 through 880 in which the cache memory system 100 may provide requested data of a memory address in the second mode.

As described in the foregoing, at least one bit may overlap between tag bits and set index bits among bits representing the memory address.

In operation 810, operation 815, and operation 820, the cache memory system 100 may determine whether the data of the memory address is present in the first cache 110 or the second cache 120.

The set index bits may designate a location in the first cache 110 and a location in the second cache 120.

The tag bits may be compared or matched with a tag corresponding to the designated location in the first cache 110 or a tag corresponding to the designated location in the second cache 120 to determine whether the data of the memory address is present in the first cache 110 or the second cache 120.

In operation 810, the first comparing unit 130 may compare the tag of the first cache 110 to the tag bits of the memory address. When a value of the tag of the first cache 110 corresponding to the set index bits is equal to a value of the tag bits of the first cache 110, the first comparing unit 130 may generate a 'hit'. When a value of the tag of the first cache 110 corresponding to the set index bits differs from a value of the tag bits of the first cache 110, the first comparing unit 130 may generate a 'miss'.

In operation 815, the second comparing unit 140 may compare the tag of the second cache 120 to the tag bits of the memory address. When a value of the tag of the second cache 120 corresponding to the set index bits is equal to a value of the tag bits of the second cache 120, the second comparing unit 140 may generate a 'hit'. When a value of the tag of the second cache 120 corresponding to the set index bits is different from a value of the tag bits of the second cache 120, the second comparing unit 140 may generate a 'miss'.

In operation 820, the determining unit 150 may determine whether a 'hit' is generated. When a 'hit' is generated, that is, when it has been determined that the data is present in the first cache 110 or the second cache 120, operation 830 may be performed. When a 'miss' is generated, that is, when the data is absent in the first cache 110 and the second cache 120, operation 850 may be performed.

In operation 830, operation 840, and operation 845, when the data is present in the first cache 110 or the second cache 120, the data may be read from the first cache 110 or the second cache 120. That is, the data may be read from the first cache 110 if the data is present in the first cache 110, and the data may be read from the second cache 120 if the data is present in the second cache 120, as shown below in operations 840 and 845.

In operation 830, the determining unit 150 may determine whether a 'hit' is generated by the first cache 110.

In operation 840, when a 'hit' is generated by the first cache 110, the cache memory system 100 may read the data of the memory address from the first cache 110.

In operation 845, when a 'hit' is generated by the second cache 120, the cache memory system 100 may read the data of the memory address from the second cache 120.

In operation 850, operation 860, operation 870, and operation 875, when the data is absent in the first cache 110 and the second cache 120, the data of the memory address may be written in a selected cache among the first cache 110 and the second cache 120. The selected cache may be determined based on an ID bit corresponding to at least one bit of the set index bits.

In operation 850, data including the data of the memory address may be extracted from an external memory. The extracting may include requesting, by the cache memory system 100 or the determining unit 150, the data of the memory address from the external memory and receiving the data including the data of the memory address from the external memory.

In operation 860, the cache memory system 100 may verify whether a value of the ID bit is 0. The zero value of the ID bit may represent that the set index bits indicate the first cache 110. When the value of the ID bit is 1, the set index bits may indicate the second cache 120.

In operation 870, when the value of the ID bit is 0, the data including the data of the memory address may be written in the first cache 110 for subsequent reference.

In operation 875, when the value of the ID bit is 1, the data including the data of the memory address may be written in the second cache 120 for subsequent reference.

In operation 880, the cache memory system 100 may output the data of the memory address.

The technical disclosure provided with reference to FIGS. 1 through 7 may be applied, and a detailed description is omitted herein for conciseness.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), RAM, flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Further, according to an aspect of the embodiments, any combinations of the described features, functions and/or operations can be provided.

Moreover, the cache memory system 100 may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of providing data of a memory address, comprising:
   determining whether the data is present in a first cache or a second cache of a cache memory system;
   reading the data from the first cache or the second cache in response to the data being determined to be present in the first cache or the second cache, respectively;
   in response to the cache memory system being operated in a first mode, using the first cache and the second cache independently;
   in response to the cache memory system being operated in a second mode, sharing the first cache and the second cache; and
   in response to the cache memory system alternating from the first mode to the second mode, maintaining a number of tag bits to be consistant and increasing a number of set index bits by one,
   wherein bits representing the memory address comprise at least one bit overlapping between the tag bits and the set index bits, and
   tag data is a fixed size.

2. The method of claim 1, wherein the set index bits designate a location in the first cache and a location in the second cache, and
   the tag bits are compared with a tag corresponding to the designated location in the first cache or a tag corresponding to the designated location in the second cache to determine whether the data of the memory address is present in the first cache or the second cache.

3. The method of claim 2, further comprising:
   writing data received from an external memory in a selected cache among the first cache and the second cache when the data is determined to be absent from both the first cache and the second cache,
   wherein the selected cache is determined based on at least one bit of the set index bits.

4. A cache memory system comprising:
   a first cache; and
   a second cache,
   wherein;
   the cache memory system is operated in a mode selected in an alternating manner among a first mode and a second mode,
   in response to the cache memory system being operated in the first mode, the first cache and the second cache are used independently,
   in response to the cache memory system being operated in the second mode, the first cache and the second cache are shared, and in response to the cache memory system alternating from the first mode to the second mode, a number of the tag bits is maintained to be constant and a number of set index bits is increased by one.

5. The cache memory system of claim 4, wherein in the first mode, the first cache and the second cache are used independently to provide data cached for a first memory address and data cached for a second memory address respectively, and
   wherein in the second mode, the first cache and the second cache are shared to provide data cached for a third memory address.

6. The system of claim 5, wherein first tag bits and first set index bits among bits representing the first memory address do not overlap one another,
   the first set index bits designate a first location in the first cache,
   the first tag bits are compared with a tag corresponding to the first location of the first cache to determine whether data of the first memory address is present in the first cache,
   second tag bits and second set index bits among bits representing the second memory address do not overlap one another,
   the second set index bits designate a second location in the second cache, and
   the second tag bits are compared with a tag corresponding to the second location of the second cache to determine whether data of the second memory address is present in the second cache.

7. The system of claim 5, wherein at least one bit overlaps between third tag bits and third set index bits among bits representing the third memory address,
   the third set index bits designate a third location in the first cache and a fourth location in the second cache, and
   the third tag bits are compared with a tag corresponding to the third location in the first cache or a tag corresponding to the fourth location in the second cache to determine whether data of the third memory address is present in the first cache or the second cache.

8. The system of claim 5, wherein the cache memory system provides texel data for trilinear filtering in the first mode and texel data for bilinear filtering in the second mode.

9. The system of claim 8, wherein the first cache provides texel data of a first texture image in the first mode, the second cache provides texel data of a second texture image in the first mode, and the first texture image and the second texture image correspond to different levels of texture images in a mipmap.

10. The system of claim 4, wherein at least one bit overlapping between the third tag bits and the third set index bits is used to select one of the first cache and the second cache in the second mode.

11. The system of claim 4, wherein data stored in the first cache or the second cache continues to be used when the cache memory system shifts from the first mode to the second mode or from the second mode to the first mode.

12. The system of claim 4, wherein first set index bits designate a first location in the first cache, and in response to a value of the first set index bits being $n_1$, a number of the first set index bits is determined by $\log_2 K$, wherein $n_1$ is an integer of 1 or more and k is an integer between 0 and K−1, K being equal to a number of cache lines.

13. A method of providing data in a cache memory system comprising a first cache and a second cache, the method comprising:
    operating the cache memory system in a first mode;
    operating the cache memory system in a second mode; and in response to the cache memory system alternating from the first mode to the second mode, maintaining a number of tag bits to be constant and increasing a number of set index bits by one, wherein the cache memory system is operated in a mode selected in an alternating manner among the first mode and the second mode, such that in the first mode, the first cache and the second cache are used independently, and in the second mode, the first cache and the second cache are shared.

14. The method of claim 13, wherein in the first mode, the first cache and the second cache are used independently to provide data cached for a first memory address and data cached for a second memory address respectively, and in the second mode, the first cache and the second cache are shared to provide data cached for a third memory address.

15. The method of claim 14, wherein first tag bits and first set index bits among bits representing the first memory address do not overlap one another, the first set index bits designate a first location in the first cache, the first tag bits are compared with a tag corresponding to the first location of the first cache to determine whether data of the first memory address is present in the first cache, second tag bits and second set index bits among bits representing the second memory address do not overlap one another, the second set index bits designate a second location in the second cache, and the second tag bits are compared with a tag corresponding to the second location of the second cache to determine whether data of the second memory address is present in the second cache.

16. The method of claim 14, wherein at least one bit overlaps between third tag bits and third set index bits among bits representing the third memory address, the third set index bits designate a third location in the first cache and a fourth location in the second cache, and the third tag bits are compared with a tag corresponding to the third location in the first cache or a tag corresponding to the fourth location in the second cache to determine whether the data of the third memory address is present in the first cache or the second cache.

17. The method of claim 14, wherein the cache memory system provides texel data for trilinear filtering in the first mode and texel data for bilinear filtering in the second mode.

18. The method of claim 17, wherein the first cache provides texel data of a first texture image in the first mode, the second cache provides texel data of a second texture image in the first mode, and the first texture image and the second texture image correspond to different levels of texture images in a mipmap.

19. The method of claim 14, wherein at least one bit overlapping between the third tag bits and the third set index bits is used to select one of the first cache and the second cache in the second mode.

20. The method of claim 14, wherein data stored in the first cache or the second cache continues to be used when the cache memory system shifts from the first mode to the second mode or from the second mode to the first mode.

21. A method of providing data of a memory address, comprising:

determining whether the data is present in a first cache or a second cache of a cache memory system;

accessing each of the first cache and the second cache, according to shared set index bits, among bits representing the memory address; and generating a hit in response to determining that the data is present in at least one of the first cache and the second cache;

in response to the cache memory system being operated in a first mode, using the first cache and the second cache independently;

in response to the cache memory system being operated in a second mode, sharing the first cache and the second cache; and in response to the cache memory system alternating from the first mode to the second mode, maintaining a number of tag bits to be consistant and increasing a number of set index bits by one.

22. A method of providing data, comprising:

sharing cache memories of a cache memory system when operating in a predetermined mode;

determining, by a processor, whether data of a memory address is present in the shared cache memories, using shared set index bits, among bits representing the memory address;

generating a hit in response to the data being present in one of the shared cache memories;

in response to the cache memory system being operated in a first mode, using the first cache and the second cache independently;

in response to the cache memory system being operated in a second mode, sharing the first cache and the second cache; and in response to the cache memory system alternating from the first mode to the second mode, maintaining a number of tag bits to be consistant and increasing a number of set index bits by one.

* * * * *